United States Patent Office 3,274,143
Patented Sept. 20, 1966

3,274,143
LACTONE POLYESTERS AS PLASTICIZERS FOR VINYL RESINS
Fritz Hostettler, Charleston, W. Va., and Donald M. Young, New York, N.Y., assignors to Union Carbide Corporation, a corporation of New York
No Drawing. Filed Nov. 12, 1963, Ser. No. 323,154
23 Claims. (Cl. 260—32.2)

This application is a continuation-in-part of application Serial No. 314,485, entitled "Lactone Polyesters," by D. M. Young and F. Hostettler, filed October 7, 1963, now U.S. Patent No. 3,169,945, which in turn is a continuation-in-part of application Serial No. 577,950, entitled "Lactone Polyesters," by D. M. Young and F. Hostettler, filed April 13, 1956, now abandoned, all of the aforesaid applications being assigned to the same assignee.

This invention relates to the preparation of plasticized compositions.

A major shortcoming of externally-plasticized, flexible resin compositions, e.g., poly(vinyl halide), is the tendency of the plasticizer to escape from the plasticized composition by volatilization or by extraction processes. These tendencies become aggravated or more pronounced at elevated temperatures such as in fields of applications in which the plasticized composition is used, for example, as an insulating medium for wire and cable. Contact with various liquid media, e.g., water, oil, fats, etc., also can result in the extraction or loss of the plasticizer in the plasticized composition. Loss of the plasticizer eventually can cause undesirable stiffening of the plasticized composition which ultimately leads to failure by cracking, excessive stiffening, shrinkage, and the like.

The instant invention encompasses the preparation of novel plasticized resins, in particular, the preparation of plasticized vinyl resins, using various liquid lactone polyesters described hereinafter as the plasticizing agents. The aforesaid liquid lactone polyesters have the unique advantage, hitherto so elusive in the development of plasticizers, of combining excellent low temperature performance, i.e., imparting good flexibility to resins even at temperatures below zero, with low volatility and high resistance to water and oil extraction. They are available as easily-pourable liquids, and are therefore susceptible to facile handling and mixing as compared with the highly viscous, non-pourable plasticizers heretofore available. At the same time, these plasticizers are non-toxic and light-stable.

The plasticizers which are contemplated are prepared by the polymerization reaction of a lactone and an initiator in the presence or absence of an ester interchange catalyst to form lactone polyesters of widely varying and readily controllable molecular weight. The polymerization is initiated by reaction with one or more compounds having at least one reactive hydrogen capable, with or without the aid of a catalyst, of opening the lactone ring and adding it as an open chain without forming water of condensation. Compounds that are suitable for initiating the polymerization, and therefore referred to herein as initiators, include monofunctional initiators such as alcohols and amines, and polyfunctional initiators such as polyols, polyamines, amino alcohols, and vinyl polymers, as well as amides, sulfonamides, hydrozones, semicarbazones, oximines, polycarboxylic acids, hydroxy carboxylic acids and aminocarboxylic acids.

The lactone used as a starting material in the aforesaid polymerization reaction may be any lactone or combination of lactones, having at least six carbon atoms, for example, from six to eight carbon atoms in the ring and at least one hydrogen substituent on the carbon atom which is attached to the oxy group in said ring. In one aspect, the lactone used as starting material can be represented by the general formula:

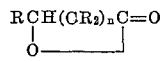

in which $n$ is at least four, for example, from four to six, at least $n+2$ R's are hydrogen, and the remaining R's are substituents selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring, are considered unsuitable for the purposes of the invention because of the tendency that polymers thereof have to revert to the monomer, particularly at elevated temperature.

The lactones which are preferred are the epsilon-caprolactones having the general formula:

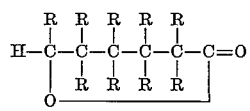

wherein at least six of the R's are hydrogen and the remainder are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Unsubstituted epsilon-caprolactone, in which all the R's are hydrogen, is derived from 6-hydroxyhexaonic acid. Substituted epsilon-caprolactones, and mixtures thereof, are available by reacting a corresponding substituted cyclohexanone with an oxidizing agent such as peracetic acid, as described in copending application Serial No. 548,754, filed November 23, 1955, now abandoned. The cyclohexanones may be obtained from substituted phenols or by other convenient synthetic routes.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not di-substituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enantholactone and eta-caprylolactone may also be polymerized.

The lactone polyesters which are useful as plasticizers include lactone polyesters of individual unsubstituted and substituted lactones, lactone copolyesters of different substituted lactones and lactone copolyesters of substituted and unsubstituted lactones, as well as blends thereof. In general, optimum results are obtainable with lactone polyesters derived from monomethyl substituted lactones and with lactone copolyesters derived from unsubstituted and monomethyl substituted lactones. Generally, however, the choice of initial lactone or combinations of lactones is practically unlimited except in so far as is pointed out with reference to the tendency of highly substituted lactones to revert to monomeric forms, particularly at higher temperatures.

Alcohols that are useful as monofunctional initiators include primary, secondary, and tertiary aliphatic alcohols such as methanol, ethanol, propanol, isopropanol, 1 - butanol, 2 - butanol, tert. - butanol, 1 - pentanol, 3 - pentanol, tert. - amyl alcohol, 1 - hexanol, 4 - methyl-3 - pentanol, 2 - ethyl - 1 - butanol, 1 - heptanol, 3 - heptanol, 1 - octanol, 2 - ethyl - 1 - hexanol, 1 - nonanol, 2,6 - dimethyl - 4 - heptanol, 2,6,8 - trimethyl - 4 - nonanol, 5 - ethyl - 2 - nonanol, 7 - ethyl - 2 - methyl - 4 - undecanol, 3,9 - triethyl - 6 - decanol, and lauryl alcohol; aromatic alcohols such as benzyl alcohol and phenyl methyl carbinol; and cycloaliphatic alcohols such as cyclohexanol and trimethylcyclohexanol.

Amines that are useful as monofunctional initiators include primary and secondary aliphatic amines such as methyl, ethyl, n - propyl, isopropyl, n - butyl, sec - butyl, isobutyl, tert. - butyl, n - amyl, n - hexyl and 2 - ethylhexylamine, as well as the corresponding dialkyl amines; aromatic amines such as aniline, ortho - toluidine, metatoluidine, and diphenylamine; cycloaliphatic amines such as cyclohexyl- and dicyclohexylamine; and heterocyclic amines such as pyrrolidine, piperidine, and morpholine.

Diols that are suitable as bifunctional initiators include glycols of the formula $HO(CH_2)_nOH$ in which $n$ equals 2 to 10, glycols of the formulae $HO(CH_2CH_2O)_nH$ and $HO[CH(CH_3)CH_2O]_nH$ in which $n$ equals 1 to 40, such as ethylene glycol, diethylene glycol, and the like, 2,2 - dimethyl - 1,3 - propanediol, 2,2 - diethyl - 1,3- propanediol, 3 - methyl - 1,5 - pentanediol, N - methyl and N - ethyl diethanolamines, various cyclohexanediols, 4,4' - methylenebiscyclohexanol, 4,4' - isopropylidenebiscyclohexanol, various xylenediols, various hydroxymethyl-cyclohexonal, various xylenediols, various hydroxymethyl-phenethyl alcohols, various hydroxymethyl - phenylpropanols, various phenylenediethanols, various phenylenedipropanols, and various heterocyclic diols such as 1,4-piperazinediethanol.

Other suitable diols include polyoxyalkylated derivatives of difunctional compounds having two reactive hydrogen atoms. These difunctional compounds may contain primary or secondary hydroxyls, phenolic hydroxyls, primary or secondary amino groups, amido, hydrozino, guanido, ureido, mercapto, sulfino, sufonamide, or carboxyl groups. They are obtainable by reacting diols of the class $HO(CH_2)_nOH$, where $n$ equals 2 to 10, propylene glycol, thiodiethanol, xylenediols, 4,4' - methylenediphenol, 4,4' - isopropylidenediphenol, and resorcinol; mercapto alcohols, like mercaptoethanol; dibasic acids, such as maleic, succinic, glutaric, adipic, pimelic, sebacic, phthalic, tetrahydrophthalic, and hexahydrophthalic; phosphorous acid; aliphatic, aromatic, and cycloaliphatic primary monoamines, like methylamine, ethylamine, propylamine, butylamine, aniline, cyclohexylamine; secondary diamines, like N,N' - dimethylethylenediamine; and amino alcohols containing a secondary amino group, like N - methylethanolamine, with alkylene oxides such as ethylene oxide, propylene oxide, 1 - butylene oxide, 2-butylene oxide, isobutylene oxide, butadiene monoxide, styrene oxide, and also mixtures of these monoepoxides.

The preparation of the polyoxyalkylated derivatives suitable for the purposes of the invention is illustrated by the reaction of 1,4 - butanediol with ethylene oxide:

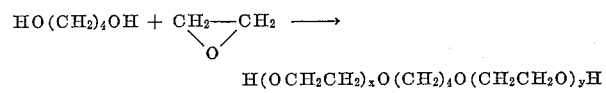

$$H(OCH_2CH_2)_xO(CH_2)_4O(CH_2CH_2O)_yH$$

where $x+y=1$ to 40.

Other useful bifunctional initiators are polymers of monoepoxides obtainable by polymerizing with such catalysts as oxonium salts of hydrogen halides; metal or non-metal halides whose etherates are oxonium complexes; electrophilic metal or non-metal halides in the presence of hydrogen halides, acyl halides; or anhydrides of inorganic and organic acids; and inorganic acids or anhydrides thereof whose anions show little tendency to polarize. Polymers containing hydroxyl end groups can be obtained by treating these products with alkaline reagents upon completion of the polymerization reaction. Among suitable monoepoxides for preparing such polymers are tetrahydrofuran, trimethylene oxide, propylene oxide, ethylene oxide and mixtures thereof.

Higher functional alcohols suitable for initiating the polymerization of lactones include triols such as glycerol, trimethylolpropane, 1,2,4-butanetriol, 1,2,6-hexanetriol, N-triethanolamine, and N-triisopropanolamine; various tetrols like erythritol, pentaerythritol, N,N,N',N'-tetrakis (2-hydroxyethyl)ethylenediamine and N,N,N',N'-tetrakis (2-hydroxypropyl)ethylenediamine; pentols; hexols like dipentaerythritol and sorbitol; alkyl glycosides; and carbohydrates such as glucose, sucrose, starch, and cellulose.

Also suitable as polyols are the polyoxyalkylated derivatives of polyfunctional compounds having three or more reactive hydrogen atoms as, for example, the reaction product of trimethylolpropane with ethylene oxide in accordance with the reaction:

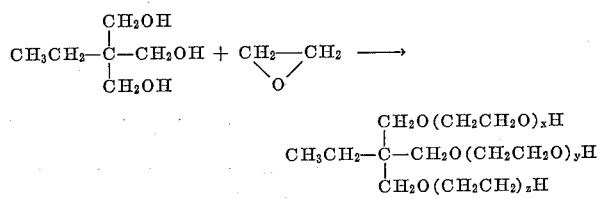

where $x+y+z=3$ to 45.

In addition to the polyoxyalkylated derivatives of trimethylolpropane, those of the following compounds are likewise suitable: glycerol, 1,2,4-butanetriol, 1,2,6-hexanetriol, erythritol, pentaerythritol, sorbitol, methyl glycosides, glucose, sucrose, diamines of the general formula $H_2N(CH_2)_nNH_2$, where $n$ equals 2 to 10, 2-(methylamino) ethylamine, various phenylene- and toluene-diamines, benzidine, 3,3'-dimethyl-4,4'-biphenyldiamine, 4,4'-methylenedianiline, 4,4',4''-methylidynetrianiline, cycloaliphatic diamines, like 2,4-cyclohexanediamine and 1-methyl-2,4-cyclohexanediamine, amino alcohols of the general formula $HO(CH_2)_nNH_2$, where $n$ equals 2 to 10, diethylenetriamine, triethylenetetramine, tetraethylenepentamine, poly-carboxylic acids like citric acid, aconitic acid, mellitic acid, and pyromellitic acid, and polyfunctional inorganic acids like phosphoric acid.

Difunctional amino alcohols capable of initiating the polymerization of lactones include aliphatic amino alcohols of the general formula $HO(CH_2)_nNH_2$, where $n$ equals 2 to 10, N-methylethanolamine,

isopropanolamine,

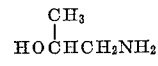

N-methylisopropanolamine,

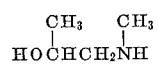

aromatic amino alcohols like para-amino-phenethyl alcohol,

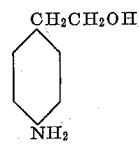

and para-amino-alpha-methylbenzyl alcohol,

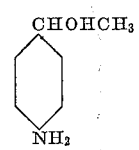

and various cycloaliphatic amino alcohols like 4-aminocyclohexanol.

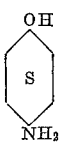

Higher functional amino alcohols having a total of at least three hydroxy and primary or secondary amino groups that are suitable in the method of the invention include diethanolamine, diisopropanolamine, 2-(2-aminoethylamino)ethanol $H_2NCH_2CH_2-NH-CH_2CH_2OH$, and 2-amino-2-(hydroxymethyl)-1-3-propanediol.

Suitable diamines include aliphatic diamines of the general formula $H_2N(CH_2)_nNH_2$, monosecondary diamines of the general formula $R''NH(CH_2)_nNH_2$, and disecondary diamines of the general formula $$R''NH(CH_2)_nNHR''$$

where $n$ equals 2 to 10 and where $R''$ is alkyl, aryl, aralkyl or cycloalkyl; aromatic diamines, like meta-phenylenediamine, para-phenylenediamine, toluene - 2,4 - diamine, toluene-2,6-diamine, 1,5-naphthalenediamine, 1,8-naphthalenediamine, meta-xylylenediamine, para-xylylenediamine, benzidine, 3,3' - dimethyl - 4,4' - biphenyldiamine, 3,3' - dimethoxy - 4,4' - biphenyldiamine, 3,3'-dichloro-4,4' - biphenyldiamine, 4,4' - methylenedianiline, 4,4'-ethylenedianiline, 2,3,5,6 - tetramethyl - para - phenylenediamine, 2,5-fluorenediamine, and 2,7-fluorenediamine; cycloaliphatic diamines like 1,4-cyclohexanediamine, 4,4'-methylenebiscyclohexylamine, and 4,4'-isopropylidenebiscyclohexylamine; and heterocyclic amines such as piperazine, 2,5-dimethylpiperazine, and 1,4-bis(3-aminopropyl)piperazine.

Illustrative of the higher functional polyamines which can be employed as initiators include, for example, diethylenetriamine, triethylenetetramine, tetraethylenepentamine, dipropylenetriamine, tripropylenetetramine, tetrapropylenepentamine, 1,2,5 - benzenetriamine, toluene-2,4,6-triamine, and 4,4',4''-methylidynetrianiline and polyamines obtained by interaction of aromatic monoamines with formaldehyde or other aldehydes, for example:

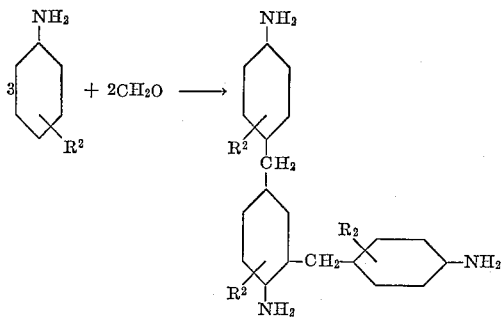

and other reaction products of the above general type, where $R^2$ is H or alkyl.

Lactones will also react with and polymerize on vinyl polymers containing reactive hydrogen atoms in side groups along the polymer molecule, particularly the reactive hydrogen atoms in hydroxyl and primary and secondary amino groups. Such vinyl polymers may, for example, be obtained by copolymerization of ethylene and vinyl acetate followed by subsequent saponification of the acetate groups to yield polymers represented by the following formula:

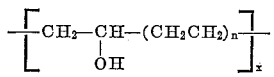

Other vinyl polymers that are suitable include polyvinyl alcohol, copolymers obtainable by copolymerization of a vinyl monomer such as ethylene with other vinyl monomers containing primary or secondary hydroxyl or amino groups or other groups containing reactive hydrogen atoms. Among the vinyl monomers from which such copolymers may, for example, be obtained are: ortho-, meta-, or para-aminostyrene, 3-butene-1,2-diol $CH_2=CH-CHOH-CH_2OH$, allyl alcohol, methallyl alcohol, 3-phenyl-3-butene-1-ol, and vinyl ethers like diethylene glycol monovinyl ether $$CH_2=CH-OCH_2CH_2OCH_2CH_2OH$$

Representatives of the many polycarboxylic acids that are suitable as polyfunctional initiators are such dicarboxylic acids as oxalic acid, succinic acid, maleic acid, glutaric acid, adipic acid, pimelic acid, suberic acid, azelaic acid, sebacic acid, 4,4'-oxydibutyric acid, 5,5'-oxydivaleric acid, 6,6'-oxydihexanoic acid, 4,4'-thiodibutyric acid, 5,5'-thiodivaleric acid, 6,6'-thiodihexanoic acid, itaconic acid, phthalic acid, isophthalic acid, terephthalic acid, 1,5-naphthoic acid, 2,7-naphthoic acid, 2,6-naphthoic acid, 3,3'-methylenedibenzoic acid, 4,4'-(ethylenedioxy)dibenzoic acid, 4,4'-biphenyl-dicarboxylic acid, 4,4'-sulfonyldibenzoic acid, 4,4'-oxydibenzoic acid, various tetrahydrophthalic acids, and various hexahydrophthalic acids, as well as higher functional acids such as tricarballylic acid, aconitic acid, citric acid, hemimellitic acid, trimellitic acid, trimesic acid, pyromellitic acid, 1,2,3,4-butanetetracarboxylic acid.

Suitable hydroxy- and aminocarboxylic acids include 2-hydroxypropionic acid, 6-hydroxycaproic acid, 11-hydroxyundecanoic acid, salicyclic acid, para-hydroxybenzoic acid, beta-alanine, 6-aminocaproic acid, 7-aminoheptanoic acid, 11-amino-undecanoic acid, and para-aminobenzoic acid.

The initiator is believed to open the lactone ring to produce an ester or amide having one or more terminal groups that are capable of opening further lactone rings and thereby of adding more and more lactone to the molecule. Thus, for example, the polymerization of epsilon-caprolactone initiated with an amino alcohol is believed to take place primarily as follows:

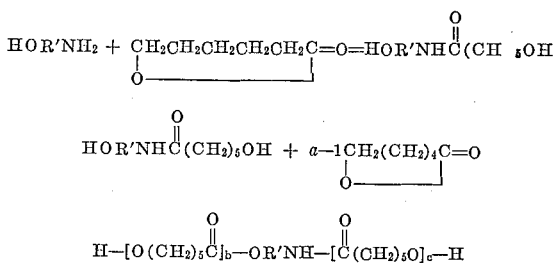

wherein $R'$ in the initiator and in the polyester is an organic radical selected from the group consisting of aliphatic, cycloaliphatic, aromatic and heterocyclic radicals, and $a=b+c$.

Similarly, a monoamine opens and adds a succession of lactone rings as shown in the equation:

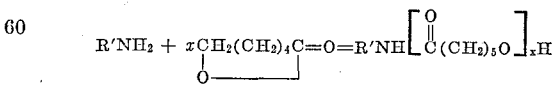

and a dicarboxylic acid, for example, takes part in polymerizing lactones somewhat as follows:

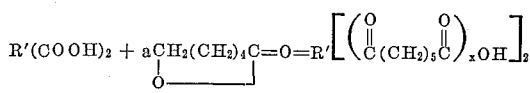

in which the average value of $x$ is $a/2$. It will be apparent from these equations that the lactone polyesters prepared in accordance with this embodiment can conveniently be represented by the general formula:

$$R'(YL_xZ)_y$$

in which the L's stand for substantially linear groups having the general formula:

$$-\overset{O}{\underset{\|}{C}}(CR_2)_n CHRO-$$

wherein $n$ is at least four, at least $n+2$ R's are hydrogen, the remaining R's are substituents selected from the group consisting of hydrogen, alkyl, cycloalkyl, alkoxy and single ring aromatic hydrocarbon radicals, and the total number of carbon atoms in the substituents on a given residue does not exceed about twelve. The subscript $x$ averages at least two and preferably a number large enough to make the total molecular weight of the polyester about 1500 or higher. The number of linear groups in the final polyester will depend in large part upon the molar ratio of lactone to initiator. R' is the organic radical from the initiator and $y$ is a number equal to the functionality of the initiator, i.e., at least 1. The Y's stand for —O—, —NH—, —NR"—, and $$-\overset{}{\underset{\|}{\overset{C}{O}}}-$$

R" being a hydrocarbon radical selected from the group consisting of alkyl, aryl, aralkyl and cycloalkyl radicals, and the Z's stand for H or OH, being OH when Y is $$-\overset{}{\underset{\|}{\overset{C}{O}}}-$$

but otherwise H. If the polyester is acylated or esterified, as described later, the Z's also stand for alkoxy or acyl radicals, being alkoxy when Y is $$-\overset{}{\underset{\|}{\overset{C}{O}}}-$$

but otherwise acyl. It will be understood that when Y is $$-\overset{}{\underset{\|}{\overset{C}{O}}}-$$

it will be attached to the oxy group of an "L" group and otherwise it will be linked to the carbonyl of an "L" group.

To initiate and continue the polymerization of the lactone, the lactone and the initiator are preferably heated to a temperature between about 130 and 200° C. in order to achieve a practical and desirable rate of reaction with a minimum of decomposition. The temperature may be considerably lower however, i.e., as low as about 50° C. at the sacrifice of speed of reaction. It may also be considerably higher, i.e., up to about 300° C., although care must be taken at such higher temperatures because of the more likely losses, at temperatures above 250° C., due to decomposition or undesirable side reactions. Generally, therefore, a temperature range of 50 to 300° C. is considered operable and a more limited range between about 130 and 200° C. is considered preferable.

The polymerization may be, and preferably is, carried out with the use of a catalyst, such as a basic or neutral ester interchange catalyst, to accelerate the reaction. Among catalysts suitable for this purpose are such metals as lithium, sodium, potassium, rubidium, caesium, magnesium, calcium, barium, strontium, zinc, aluminum, titanium, cobalt, germanium, tin, lead, antimony, arsenic, and cerium, as well as the alkoxides thereof. Additional suitable catalysts are, by way of example, the carbonates of alkali- and alkaline earth metals, zinc borate, lead borate, zinc oxide, lead silicate, lead arsenate, litharge, lead carbonate, antimony trioxide, germanium dioxide, cerium trioxide, cobaltous acetate and aluminum isopropoxide. Catalyst concentrations between about 0.001 and 0.5%, based on the weight of the starting lactones, are suitable. The preferred range is from 0.01 to 0.2%.

The catalysts that are particularly effective, and therefore preferred, in polymerizing the more difficulty polymerizable lactones such as epsilon-methyl-epsilon-caprolactone and the various dimethyl epsilon-caprolactones without undue discoloration of the polyesters are zinc borate, lead borate, zinc oxide, litharge (lead oxide), and especially organic titanium compounds.

The organic titanium compounds that are especially suitable as catalysts because of their ability to promote the formation of virtually colorless polyesters in a short time are the titanates having the general formulae:

$$X_2TiO_3 \text{ and } X_4TiO_4$$

in which the X's are alkyl, aryl or aralkyl radicals, the alkyl titanates in which the X's are lower alkyl radicals, particularly methyl, ethyl, propyl, isopropyl, butyl, isobutyl, tertiary butyl, amyl, isoamyl, etc., radicals being preferred. Titanates that deserve special mention because of their efficiency in accelerating the reaction and producing virtually colorless polyesters are tetraisopropyl titanate and tetrabutyl titanate.

The duration of the polymerization varies from about a few minutes to about a week depending upon the lactone or mixtures of lactones selected, the initiator, the reaction temperature and the catalyst, if one is present. If it is desired to obtain a product of superior color, then it is preferable to conduct the reaction in the absence of oxygen. This may be accomplished, for example, by operating in a partial vacuum or in the presence of an inert gas such as nitrogen, which may be passed through the reaction mixture. After the polymerization is completed, any unreacted monomer may be removed by applying a vacuum thereto at elevated temperature, e.g., a vacuum of 1 to 5 mm. mercury at 120–160° C.

The lactone polyester products obtained in accordance with the aforesaid processes have molecular weights generally upwards of about 1500, although molecular weights below and substantially above this figure are obtainable if desired, for example, as low as about 300 (corresponding to a hydroxyl number of 374) or about 500 to as high as 5000 and even 7000 (corresponding to a hydroxyl number of 16) and even higher still to about 9000. With reactive vinyl polymers as initiators, the average molecular weight of the lactone polyesters can easily go as high as 20,000, and higher. In general, the molecular weight can range between about 1500 and about 9000. The lactone polyesters also have reactive terminal hydroxyl or carboxyl groups, the number of reactive terminal groups depending upon the functionality of the initiator. They are characterized by the presence of series of interconnected, substantially linear units or groups composed of carbon, hydrogen, and oxygen. The interconnected units are opened lactone residues each having a terminal oxy group at one end, a carbonyl group at the other end, an intermediate chain of at least five carbon atoms and at least one hydrogen substituent on the carbon atom in the intermediate chain that is attached to the terminal oxy group. The oxy group of one lactone residue is connected to the carbonyl group of an adjacent lactone residue in the series and the oxy group of the last lactone residue in a series is connected, unless the initiator used was a polycarboxylic acid, to a hydrogen to form a terminal hydroxyl group at one end of the series.

The preparation of the lactone polyesters prepared in accordance with the aforesaid methods has a number of outstanding advantages. One that is unique and of utmost importance is that with the particular catalysts employed, and without catalysts, the lactone polyesters are formed with reactive end groups that are not blocked to any significant extent by ester groups, chlorine, or the like. Another very important advantage is that no water of condensation is formed and that consequently for many applications the need for drying is obviated. In addition, the aforesaid methods have the advantage of permitting accurate control over the average molecular weight of the lactone polyester, and further of promoting the formation of a substantially homogeneous lactone polyester in which the molecular weights of the individual molecules are substantially all very close to the average molecular weight. This control is obtained by preselecting the molar proportions of lactone and initiator in a manner that will readily be appreciated by those skilled in the art. Thus, for example, if it is desired to form a lactone polyester in which the average molecular weight is approximately twenty times the molecular weight of the initial lactone or lactone mixture, then the proportions of lactone or lactone mixture to initiator utilized in the polymerization reaction are fixed at approximately 20:1 inasmuch as it is to be expected that on the average each molecule of initiator will add on an approximately equal number of lactones and an average of twenty lactone molecules would be available to each molecule of initiator.

A convenient method of measuring the molecular weight of the lactone polyester is to determine the average number of carboxyl and hydroxyl groups in a given amount of the lactone polyester. The acid number (milligrams of KOH per gram of lactone polyester using phenolphthalein as an indicator) is a measure of the number of terminal carboxyl groups in a lactone polyester. The hydroxyl number, which is a measure of the number of terminal hydroxyl groups and is defined in terms of milligrams of KOH per gram of lactone polyester, is determined by adding pyridine and acetic anhydride to the lactone polyester and titrating the acetic acid formed with KOH as described in Ind. Eng. Chem., Anal. Ed., vol. 16, pages 541–9, and in Ind. Eng. Chem., Anal. Ed., vol. 17, page 394. The sum of the acid or carboxyl number and the hydroxyl number, referred to as the reactive number, is an indication of the average number of terminal groups present in the lactone polyester and therefore is in turn an indication of the number of molecules in the mass and the degree of polymerization. A lactone polyester containing long chain molecules will have a relatively low reactive number while a lactone polyester containing short short chain molecules will possess a relatively high reactive number.

While the aforesaid lactone polyesters, including those having one reactive terminal group, are most attractive as plasticizers, particularly for vinyl resins such as vinyl halide resins, they can readily be made even more attractive by acylation or esterification of their reactive terminal groups to reduce water extractability. Terminal carboxylic acid groups can be esterified in known manner by reaction with higher boiling alcohols such as the alkanols, the monoalkyl ethers of glycols, etc., e.g., 2-ethyl-1-butanol, 1-hexanol, 2-ethyl-1-hexanol, 3-heptanol, 2-butyl-1-octanol, 2,6,8-trimethyl-4-nonanol, 5-ethyl-2-nonanol, 7-ethyl - 2 - methyl - 4 - undecanol, 3,9 - diethyl - 6 - tridecanol, ethylene glycol monobutyl ether, diethylene glycol monoethyl ether, diethylene glycol monoethyl ether, and diethylene glycol monobutyl ether. Terminal hydroxyl groups are readily esterified by reaction with acids such as the aliphatic monocarboxylic acids as exemplified by acetic acid, 2-ethylhexanoic acid, etc., and preferably their anhydrides.

It has been observed, however, that optimum plasticizing properties are unexpectedly obtained with lactone polyesters derived from the lower alkyl substituted lactones, e.g., monomethyl substituted lactones, and with lactone copolyesters derived from unsubstituted and lower alkyl substituted lactones, e.g., monomethyl substituted lactones. Though the initiator may be monofunctional or polyfunctional and though the identity of the functional groups of the initiator is not particularly critical, optimum plasticizing characteristics are oftentimes obtained by using the glycols as the initiators. The average molecular weights of the lactone polyesters have been described previously. Lactone polyesters having average molecular weights between about 2000 and about 4000 and which are derived from monomethyl substituted lactones and mixtures thereof with unsubstituted lactones, initiated by glycols, result in placticizers which oftentimes exhibit low viscosity and least discoloration characteristics.

The lactone polyesters described in this specification are eminently suitable as plasticizers for various resins, especially for vinyl resins such as the vinyl halide resins, for example: polyvinyl chloride; vinyl chloride-vinyl acetate copolymer; vinyl chloride-vinylidene chloride copolymer; natural rubber; GRS rubber; copolymers of acrylonitrile with ethylenically unsaturated compounds such as butadiene, vinyl chloride, and vinylidene chloride; polyvinyl butyral; etc.; particularly if the lactone polyesters are esterified in known manner to insolubilize the terminal hydroxyl or carboxyl groups and thus improve their resistance to extraction by water from resins with which they are combined.

The amount of plasticizing agent, i.e., lactone polyester, which can be employed is readily ascertainable by those possessing ordinary skill in the plasticizing art. The plasticizing agent of choice, the molecular weight of the plasticizing agent, the particular resin to be plasticized, the incorporation of additional additives such as stabilizers, etc., into the system, and other well known factors, will influence, to an extent, the quantity of plasticizer to be used for optimum results.

In general, any one of several known methods of mixing and fluxing can be utilized in the preparation of the plasticized compositions of the invention. For instance, the vinyl resin and plasticizer can be intimately dispersed by stirring or tumbling and the admixture fluxed into a continuous sheet on a steam heated roll mill. Other methods of mixing and fluxing, such as a Banbury cycle followed by calendering can also be employed.

Plasticized vinyl compositions were prepared by mixing the polyester compositions of Examples 1–21 with vinyl resins by fluxing the components, note Tables I–IV infra, on a two-roll mill at the temperatures indicated until a clear vinyl sheet was obtained. Tests specimens were prepared by molding at 158° C. in accordance with the various tests outlined below. Physical characteristics of the plasticized vinyl compositions are described in Tables I–IV.

The mixtures of alkyl-substituted epsilon-caprolactones described in the following examples were prepared from the alkyl-substituted cyclohexanones according to the method described by Starcher and Phillips in JACS 80, 4079 (1958). Accordingly, by way of example, a mixture of alpha-methyl- and epsilon-methyl-epsilon-caprolactones is synthesized by reacting 2-methylcyclohexanone, which can be obtained by the hydrogenation of orthocresol to 2-methylcyclohexanol followed by dehydrogenation of said secondary alcohol to the corresponding ketone, with peracetic acid. By utilization of 3-methylcyclohexanone as the co-reactant with peracetic acid there is obtained a mixture of beta-methyl- and delta-methyl-epsilon-caprolactones. The 3-methylcyclohexanone can be synthesized by hydrogenation of meta-cresol to 3-methylcyclohexanol followed by dehydrogenation of said alcohol to the corresponding ketone. Reaction of 4-methylcyclohexanone with peracetic acid yields gamma-methyl-epsilon-caprolactone. The 4-methylcyclohexanone is obtained from para-cresol in identical manner as the other substituted cyclohexanones.

By the foregoing methods it is also feasible to prepare mixtures of dimethyl-substituted-epsilon-caprolactones, ethyl-substituted-episilon-caprolactones, and higher alkyl-substituted-epsilon-caprolactones. For example, mixtures of dimethyl-substituted epsilon-caprolactones may be obtained from xylenol mixtures commercially known as "cresylic acids." These phenolic mixtures upon hydrogenation and dehydrogenation as described above yield mixtures of dimethyl-substituted cyclohexanones. Reaction of such dimethyl-substituted cyclohexanones with peracetic acid results in dimethyl-substituted epsilon-caprolactones. Other commercial products which are of importance are the cresols obtained from coal tars or from the petroleum industry. For example, mixtures of ortho-, meta-, and para-cresol, or mixtures of meta- and para-cresol upon conversion to methyl-cyclohexanones and reaction with peracetic acid will yield mixtures of methyl-substituted epsilon-caprolactones.

In the following illustrative examples, various lactone polyesters were evaluated as plasticizers for vinyl resins. In reporting the physical properties of the plasticized vinyl resin compositions certain symbols and abbreviations are employed in Tables I to V infra. Unless otherwise indicated, they are defined as follows:

(1) $T_B$ (brittle temperature) is a measure of flexibility at low temperature and is determined by an impact test in accordance with A.S.T.M. Method D746–55T.

(2) *Oil extraction* (test temperature of 50° C.) determined in accordance with the formula:

$$E_1 = \frac{100(W_1 - W_2)}{W_2}$$

wherein $E_1$ is the weight percent extraction of plasticizer, wherein $W_1$ is the original weight of the plasticized sample (four mil film), and wherein $W_2$ is the final weight of the plasticized sample after subjecting sample to mineral oil extraction test for a period of time, followed by drying in a circulating air oven at 70° C. for 30 minutes.

(3) *Water extraction* (test temperature of 70° C.) determined in accordance with the formula:

$$E_w = \left(\frac{100(W_1 - W_2)}{W_1}\right)\left(\frac{t \text{ (actual)}}{0.004}\right)$$

wherein $E_w$ is the weight percent extraction of plasticizer, wherein $W_1$ is the original weight of the plasticized sample (four mil film), wherein $W_2$ is the final weight of the plasticized sample after subjecting sample to water extraction test for a period of time, followed by drying in a circulating air oven at 70° C. for 30 minutes, wherein $t$ (actual) is the actual thickness of the sample, and wherein 0.004 is a factor to adjust the thickness of the sample to the standard 4 mils. Four mil films of plasticized material were used.

(4) *Effectiveness*, or the amount of plasticizer, reported as percent of parts per hundred of resin (pphr.), required to impart an arbitrary degree of flexibility to the composition. This flexibility is defined by a tensile modulus of 1000 p.s.i. at 100 percent elongation as measured at 24.5° C. on a Scott L–6 tensile tester.

(5) *Tensile*, or ultimate tensile strength, is measured on a Scott L–6 tensile tester using annular specimens (1.75″ I.D. and 2.00″ O.D. —0.060″ to 0.080″ thick). The L–6 is operated at a constant rate of elongation of 4 feet per minute at 25° C.

(6) *Elongation* (or percent ultimate elongation is) the increase in length at rupture with the sample at 25° C.

(7) *ASTM stiffness modulus*, or flexural stiffness at 24.5° C., is measured with a Tinius-Olsen flexural stiffness tester, in accordance with ASTM Method D747–50.

(8) *Temperature-stiffness characteristics*, $T_F$ and $T_4$, were determined with a Clash-Berg torsional stiffness tester in accordance with ASTM Method D1043–51. The values listed as $T_F$ and $T_4$ are the temperatures at which a torsional stiffness of 135,000 and 10,000 p.s.i., respectively, are reached.

(9) *Volatility* was determined in a 24-hour, activated carbon test at 70° C., in accordance with ASTM Method D1203–55.

(10) *Heat stability* was determined in a circulating air oven at 158° C. The change in color was measured with a Photovolt reflection meter, Model 610, equipped with a Wratten C–5 blue filter.

(11) *Light stability* was determined by means of outdoor exposure in Miami, Florida. The results were reported as sun-hours to failure, as indicated by a change in the physical properties or appearance of the film. A sun-hour is defined as "a cumulative period of 60 minutes during which radiant energy amounts to as much as 0.823 gram-calorie per square centimeter per minute."

(12) *Durometer "A"* hardness is a measure of resistance of indentation of an 0.25 inch specimen by a pin equipped with a truncated cone point as described in ASTM Method D676–49T.

(13) *Sweat-out* is a measure of exudation of the plasticizer on aging two weeks at room temperature.

(14) $VYNW = 97$–$98$ weight percent vinyl chloride/2–3 weight percent vinyl acetate copolymer; inherent viscosity 1.05–1.10 by ASTM D1243A (0.2 gram of polymer in 100 ml. of cyclohexanone at 30° C.).

(15) $QYSJ$ = polyvinyl chloride resin; inherent viscosity 0.75–0.8 as defined in (14) supra.

(16) $QYTQ$ = polyvinyl chloride resin; inherent viscosity 0.95–1.0 as defined in (14) supra.

It is pointed out at this time that the terms "lactone polyester" product or "lactone copolyester" product, as used herein including the appended claims, signify that the product under consideration contains at least two substantially linear units or groups composed of carbon, hydrogen, and oxygen, each unit being opened lactone residues having a terminal oxy group at one end, a carbonyl group at the other end, an intermediate chain of at least five carbon atoms, and at least one hydrogen substituent on the carbon atom in the intermediate chain that is attached to the terminal oxy group.

EXAMPLE 1

A. To a reaction flask equipped with stirrer, thermometer, nitrogen inlet tube, and reflux condenser there were charged 36 grams of 2-ethylhexanol, 600 grams of a mixture of methyl-substituted epsilon-caprolactones (prepared from a mixture of 2-, 3-, and 4-methylcyclohexanones), and 0.3 gram of dibutyltin oxide catalyst. The reactant mixture was heated to a temperature of 170° C. for a period of 18.5 hours under an atmosphere of dry nitrogen. The resulting polyester product had a hydroxyl number of 26.1, a carboxyl number of 1.2, a molecular weight of about 2150, and a viscosity of 8660 centipoises at 20° C.

B. 278 grams of the above polyester were acetylated by reacting with 68 grams of acetic anhydride at a temperature of 100° C. for a period of 5 hours. Excess acetic anhydride and acetic acid formed during the reaction were removed via distillation at 120° C. and a pressure of 4 mm. Hg. The resulting acetylated polyester had a molecular weight of about 2200, and a viscosity of 8000 centipoises at a temperature of 20° C.

EXAMPLE 2

A. To a reaction flask equipped with stirrer, thermometer, nitrogen inlet tube, and reflux condenser there were charged 57.6 grams of di-(2-ethylhexylamine), 150 grams of epsilon-caprolactone, 150 grams of a mixture of dimethyl-substituted epsilon-caprolactones (synthesized from a cresylic acid mixture, designated "Cresylic Acid No. 3," U.S. Steel Corporation), and 0.15 gram of litharge catalyst. The reactant mixture was heated to a temperature of 170 °C. for a period of 24 hours under an atmosphere of dry nitrogen. The resulting polyester product had a hydroxyl number of 35.1, a carboxyl number of 1.6, and a molecular weight of about 1465.

B. 276 grams of the above polyester were acetylated by reacting with 96 grams of acetic anhydride at a temperature of 100° C. for a period of 5 hours. Excess acetic anhydride and acetic acid formed during the reaction were removed via distillation at 120° C. and a pressure of 4 mm. Hg. The resulting acetylated polyester had a molecular weight of about 1500, and a viscosity of 8660 centipoises at a temperature of 20° C.

EXAMPLE 3

A. To a reaction flask equipped with stirrer, thermometer, nitrogen inlet tube, and reflux condenser there were charged 11.6 grams of aniline, 150 grams of epsilon-caprolactone, 150 grams of a mixture of methyl-substituted epsilon-caprolactones (prepared from a mixture of 2-, 3-, and 4-methylcyclohexanones), and 0.15 gram of tetrabutyl titanate catalyst. The reactant mixture was heated to a temperature of 170° C. for a period of 18.5 hours under an atmosphere of dry nitrogen. The resulting polyester product had a hydroxyl number of 22.0, a carboxyl number of 0.3, and a molecular weight of about 2480.

B. 224 grams of the above polyester were acetylated by reacting with 46 grams of acetic anhydride at a temperature of 100° C. for a period of 5 hours. Excess acetic anhydride and acetic acid formed during the reaction were removed via distillation at 120° C. and a pressure of 4 mm. Hg. The resulting acetylated polyester had a molecular weight of about 2525, and a viscosity of 18,800 centipoises at a temperature of 20° C.

EXAMPLE 4

To a reaction flask equipped with stirrer, thermometer, nitrogen inlet tube, and reflux condenser there were charged 7.1 grams of ethylene glycol, 221 grams of gamma-methyl-epsilon-caprolactone, and 0.05 gram of potassium carbonate catalyst. The reactant mixture was heated to a temperature of 150–180° C. for a period of 48 hours under an atmosphere of dry nitrogen. The resulting polyester product had a hydroxyl number of 54.2, a carboxyl number of 0.1, and a molecular weight of about 2075.

EXAMPLE 5

A. To a reaction flask equipped with stirrer, thermometer, nitrogen inlet tube, and reflux condenser there were charged 81.8 grams of ethylene glycol, 3298 grams of a mixture of methyl-substituted epsilon-caprolactones (prepared from a mixture of 2-, 3-, and 4-methylcyclohexanones), and 1.65 grams of dibutyltin oxide catalyst. The reactant mixture was heated to a temperature of 170° C. for a period of 24 hours under an atmosphere of dry nitrogen. The resulting polyester product had a hydroxyl number of 42.8, a carboxyl number of 0.6, and a molecular weight of about 2550.

B. 3380 grams of the above polyester were acetylated by reacting with 1353 grams of acetic anhydride at a temperature of 100° C. for a period of 5 hours. Excess acetic anhydride and acetic acid formed during the reaction were removed via distillation at 100° C. and a pressure of 2 mm. Hg. The resulting acetylated polyester had a molecular weight of about 2650, and a viscosity of 12,600 centipoises at a temperature of 20° C.

EXAMPLE 6

To a reaction flask equipped with stirrer, thermometer, nitrogen inlet tube, and reflux condenser there were charged 2.14 grams of ethylene glycol, 67 grams of a mixture of beta-, gamma-, and delta-methyl-epsilon-caprolactones, and 0.01 gram of potassium carbonate catalyst. The reactant mixture was heated to a temperature of 160° C. for a period of 48 hours under an atmosphere of dry nitrogen. The resulting polyester product had a hydroxyl number of 58.9, and a molecular weight of about 1905.

EXAMPLE 7

A. To a reaction flask equipped with stirrer, thermometer, nitrogen inlet tube, and reflux condenser there were charged 8.3 grams of ethylene glycol, 400 grams of gamma-methyl-epsilon-caprolactone, and 0.2 gram of potassium carbonate catalyst. The reactant mixture was heated to a temperature of 170°–180° C. for a period of 48 hours under an atmosphere of dry nitrogen. The resulting polyester product had a hydroxyl number of 37.3, a carboxyl number of 0.34, and a molecular weight of about 2850.

B. 400 grams of the above polyester were acetylated by reacting with 100 grams of acetic anhydride at a temperature of 100° C. for a period of 5 hours. Excess acetic anhydride and acetic acid formed during the reaction were removed via distillation at 100° C. and a pressure of 10 mm. Hg. The resulting acetylated polyester had a molecular weight of about 2940, and a viscosity of 7790 centipoises at a temperature of 20° C.

EXAMPLE 8

A. To a reaction flask equipped with stirrer, thermometer, nitrogen inlet tube, and reflux condenser there were charged 31.0 grams of ethylene glycol, 539 grams of epsilon-caprolactone, 602 grams of a mixture of beta-, gamma-, and delta-methyl-epsilon-caprolactones, and 0.55 gram of calcium methoxide catalyst. The reactant mixture was heated to a temperature of 160–180° C. for a period of 20 hours under an atmosphere of dry nitrogen. The resulting polyester product had a hydroxyl number of 48.4, a carboxyl number of 0.32, and a molecular weight of about 2280.

B. 200 grams of the above polyester were acetylated by reacting with 51 grams of acetic anhydride at a temperature of 100° C. for a period of 5 hours. Excess acetic anhydride and acetic acid formed during the reaction were removed via distillation at 100° C. and a pressure of 5–10 mm. Hg. The resulting acetylated polyester had a molecular weight of about 2370, and a viscosity of 4780 centipoises at a temperature of 20° C.

EXAMPLE 9

A. To a reaction flask equipped with stirrer, thermometer, nitrogen inlet tube, and reflux condenser there were charged 11.6 grams of ethylene glycol, 400 grams of a mixture of dimethyl-substituted epsilon-caprolactones (synthesized from a cresylic acid mixture, designated "Cresylic Acid No. 3," U.S. Steel Corporation), and 0.2 gram of dibutyltin oxide catalyst. The reactant mixture was heated to a temperature of 170° C. for a period of 5.5 hours under an atmosphere of dry nitrogen. The resulting polyester product had a hydroxyl number of 48.2, a carboxyl number of 0.6, and a molecular weight of about 2260.

B. 300 grams of the above polyester were acetylated by reacting with 135 grams of acetic anhydride at a temperature of 100° C. for a period of 5 hours. Excess acetic anhydride and acetic acid formed during the reaction were removed via distillation at 150° C. and a pressure of 2 mm. Hg. The resulting acetylated polyester had a molecular weight of about 2350, and a viscosity of 14,940 centipoises at a temperature of 20° C.

EXAMPLE 10

A. To a reaction flask equipped with stirrer, thermometer, nitrogen inlet tube, and a distillation head there were charged 298 grams of ethylene glycol, 584 grams of adipic acid, and 512 grams of a mixture of beta-, gamma-, and delta-methyl-epsilon-caprolactones. The reactant mixture was heated to 130–160° C. while water being formed during the reaction was removed via distillation. The reaction temperature was then increased to 180–200° C. and a vacuum of 20 mm. Hg. was applied for a period of 3.5 hours. The resulting polyester product had a hydroxyl number of 49.5, a carboxyl number of 1.9, and a molecular weight of about 2100.

B. 200 grams of the above polyester were acetylated by reacting with 51 grams of acetic anhydride at a temperature of 100° C. for a period of 5 hours. Excess acetic anhydride and acetic acid formed during the reaction were removed via distillation at 100° C. and a pressure of 5–10 mm. Hg. The resulting acetylated polyester had a molecular weight of about 2190.

EXAMPLE 11

A. To a reaction flask equipped with stirrer, thermometer, nitrogen inlet tube, and reflux condenser there were charged 5.35 grams of ethanolamine, 260 grams of a mixture of alpha-, beta-, gamma-, delta-, and epsilon-methyl-epsilon-caprolactones, 90 grams of a mixture of beta-, gamma, and delta-methyl-epsilon-caprolactones, and 0.15 gram of dilauryltin oxide catalyst. The reactant mixture was heated to a temperature of 170° C. for a period of 20.5 hours under an atmosphere of dry nitrogen. The resulting polyester product had a hydroxyl number of 22.4, a carboxyl number of 1.94, and a molecular weight of about 4250.

B. 305 grams of the above polyester were acetylated by reacting with 74 grams of acetic anhydride at a temperature of 100° C. for a period of 4 hours. Excess acetic anhydride and acetic acid formed during the reaction were removed via distillation at 100° C. and a pressure of 2 mm. Hg. The resulting acetylated polyester had a molecular weight of about 4340, and a viscosity of 28,640 centipoises at a temperature of 20° C.

EXAMPLE 12

A. To a reaction flask equipped with stirrer, thermometer, nitrogen inlet tube, and reflux condenser there were charged 16 grams of para-aminophenylethanol, 100 grams of a mixture of alpha-, and epsilon-methyl-epsilon-caprolactones, 250 grams of a mixture of beta-, gamma-, and delta-methyl-epsilon-caprolactones, and 0.1 gram of dibutyltin oxide catalyst. The reactant mixture was heated to a temperature of 170° C. for a period of 20.5 hours under an atmosphere of dry nitrogen. The resulting polyester product had a hydroxyl number of 30.4, a carboxyl number of 2.8, and a molecular weight of about 3450.

B. 285 grams of the above polyester were acetylated by reacting with 85 grams of acetic anhydride at a temperature of 100° C. for a period of 4 hours. Excess acetic anhydride and acetic acid formed during the reaction were removed via distillation at 100° C. and a pressure of 2 mm. Hg. The resulting acetylated polyester had a molecular weight of about 3500, and a viscosity of 22,880 centipoises at a temperature of 20° C.

EXAMPLE 13

A. To a reaction flask equipped with stirrer, thermometer, nitrogen inlet tube, and reflux condenser there were charged 7 grams of ethylenediamine, 100 grams of epsilon-caprolactone, 100 grams of a mixture of alpha-, and epsilon-methyl-epsilon-caprolactones, 150 grams of a mixture of beta-, gamma-, and delta-methyl-epsilon-caprolactones, and 0.1 grams of dibutylin oxide catalyst. The reactant mixture was heated to a temperature of 150° C. for a period of 21 hours under an atmosphere of dry nitrogen. The resulting polyester product had a hydroxyl number of 29.7, a carboxyl number of 7.1, and a molecular weight of about 2535.

B. 304 grams of the above polyester were acetylated by reacting with 125 grams of acetic anhydride at a temperature of 100° C. for a period of 4 hours. Excess acetic anhydride and acetic acid formed during the reaction were removed via distillation at 100° C. and a pressure of 2 mm. Hg. The resulting acetylated polyester had a molecular weight of about 2600, and a viscosity of 12,260 centipoises at a temperature of 20° C.

EXAMPLE 14

A. To a reaction flask equipped with stirrer, thermometer, nitrogen inlet tube, and reflux condenser there were charged 12.2 grams of 2,4-tolylenediamine, 100 grams of a mixture of alpha-, and epsilon-methyl-epsilon-caprolactones, 100 grams of a mixture of beta-, gamma-, and delta-methyl-epsilon-caprolactones, and 0.08 gram of dibutyltin oxide catalyst. The reactant mixture was heated to a temperature of 170° C. for a period of 21 hours under an atmosphere of dry nitrogen. The resulting polyester product had a hydroxyl number of 28.7, a carboxyl number of 1.3, and a molecular weight of about 3435.

B. 318 grams of the above polyester were acetylated by reacting with 95 grams of acetic anhydride at a temperature of 100° C. for a period of 4 hours. Excess acetic anhydride and acetic acid formed during the reaction were removed via distillation at 100° C. and a pressure of 2 mm. Hg. The resulting acetylated polyester had a molecular weight of about 3500, and a viscosity of 60,560 centipoises at a temperature of 20° C.

EXAMPLE 15

A. To a reaction flask equipped with a stirrer, thermometer, nitrogen inlet tube, and reflux condenser there were charged 9.13 grams of trimethylolpropane, 400 grams of a mixture of dimethyl-substituted epsilon-caprolactones (synthesized from a cresylic acid mixture, designated "Cresylic Acid No. 3," U.S. Steel Corporation), and 0.2 gram of dibutyltin oxide catalyst. The reactant mixture was heated to a temperature of 170° C. for a period of 26.5 hours under an atmosphere of dry nitrogen. The resulting polyester product had a hydroxyl number of 28.0, a carboxyl number of 0.9, and a molecular weight of about 5625.

B. 323 grams of the above polyester were acetylated by reacting with 88 grams of acetic anhydride at a temperature of 100° C. for a period of 5 hours. Excess acetic anhydride and acetic acid formed during the reaction were removed via distillation at 150° C. and a pressure of 2 mm. Hg. The resulting acetylated polyester had a molecular weight of about 5750, and a viscosity of 112,600 centipoises at a temperature of 20° C.

EXAMPLE 16

A. To a reaction flask equipped with stirrer, thermometer, nitrogen inlet tube, and reflux condenser there were charged 10.9 grams of 1,2,4-butanetriol, 400 grams of a mixture of dimethyl-substituted epsilon-caprolactones (synthesized from a cresylic acid mixture, designated "Cresylic Acid No. 3," U.S. Steel Corporation), and 0.2 gram of dibutyltin oxide catalyst. The reactant mixture was heated to a temperature of 170° C. for a period of 22.5 hours under an atmosphere of dry nitrogen. The resulting polyester product had a hydroxyl number of 41.4, a carboxyl number of 0.9, and a molecular weight of about 3880.

B. 320 grams of the above polyester were acetylated by reacting with 127 grams of acetic anhydride at a temperature of 100° C. for a period of 5 hours. Excess acetic anhydride and acetic acid formed during the reaction were removed via distillation at 150° C. and a pressure of 2 mm. Hg. The resulting acetylated polyester had a molecular weight of about 4000, and a viscosity of 58,000 centipoises at a temperature of 20° C.

EXAMPLE 17

A. To a reaction flask equipped with stirrer, thermometer, nitrogen inlet tube, and reflux condenser there were charged 12 grams of diethylenetriamine, 250 grams of a mixture of beta-, gamma-, and delta-methyl-epsilon-caprolactones, 100 grams of a mixture of alpha-, and epsilon-methyl-epsilon-caprolactones, and 0.1 gram of tetrabutyl titanate catalyst. The reactant mixture was heated to a temperature of 170° C. for a period of 17.5 hours under an atmosphere of dry nitrogen. The resulting polyester product had a hydroxyl number of 50.4, a carboxyl number of 2.6, and a molecular weight of about 3025.

B. 314 grams of the above polyester were acetylated by reacting with 102 grams of acetic anhydride at a temperature of 100° C. for a period of 4 hours. Excess acetic anhydride and acetic acid formed during the reaction were removed via distillation at 100° C. and a pressure of 2 mm. Hg. The resulting acetylated polyester had a molecular weight of about 3100, and a viscosity of 20,920 centipoises at a temperature of 20° C.

EXAMPLE 18

A. To a reaction flask equipped with stirrer, thermometer, nitrogen inlet tube, and reflux condenser there were charged 11.1 grams of dipentaerythritol, 350 grams of a mixture of beta-, and delta-methyl-epsilon-caprolactones, and 0.1 gram of zinc borate catalyst. The reactant mixture was heated to a temperature of 170° C. for a period of 22.5 hours under an atmosphere of dry nitrogen. The resulting polyester product had a hydroxyl number of 38.2, a carboxyl number of 1.4, and a molecular weight of about 7630.

B. 285 grams of the above polyester were acetylated by reacting with 115 grams of acetic anhydride at a temperature of 100° C. for a period of 4 hours. Excess acetic anhydride and acetic acid formed during the reaction were removed via distillation at 100° C. and a pressure of 2 mm. Hg. The resulting acetylated polyester had a molecular weight of about 8000, and a viscosity of 41,600 centipoises at a temperature of 20° C.

EXAMPLE 19

A. To a reaction flask equipped with stirrer, thermometer, nitrogen inlet tube, and reflux condenser there were charged 7.1 grams of tris(hydroxymethyl)aminomethane, 90 grams of epsilon-caprolactone, 260 grams of a mixture of beta-, gamma-, and delta-methyl-epsilon-caprolactones, and 0.18 gram of lead benzoate catalyst. The reactant mixture was heated to a temperature of 170° C. for a period of 23.5 hours under an atmosphere of dry nitrogen. The resulting polyester product had a hydroxyl number of 28.3, a carboxyl number of 6.1, and a molecular weight of about 5140.

B. 286 grams of the above polyester were acetylated by reacting with 115 grams of acetic anhydride at a temperature of 100° C. for a period of 4 hours. Excess acetic anhydride and acetic acid formed during the reaction were removed via distillation at 100° C. and a pressure of 2 mm. Hg. The resulting acetylated polyester had a molecular weight of about 5300, and a viscosity of 28,640 centipoises at a temperature of 20° C.

EXAMPLE 20

A. To a reaction flask equipped with stirrer, thermometer, nitrogen inlet tube, and reflux condenser there were charged 1000 grams of castor oil, 690 grams of epsilon-caprolactone, and 0.2 gram of tetrabutyl titanate catalyst. The reactant mixture was heated to a temperature of 170° C. for a period of 5 hours under an atmosphere of dry nitrogen. The resulting polyester product had a hydroxyl number of 102, a carboxyl number of 0.1, and a molecular weight of about 1650.

B. 300 grams of the above polyester were acetylated by reacting with 50 grams of acetic anhydride at a temperature of 100° C. for a period of 5 hours. Excess acetic anhydride and acetic acid formed during the reaction were removed via distillation at 120° C. and a pressure of 2 mm. Hg. The resulting acetylated polyester had a molecular weight of about 1800, and a viscosity of 700 centipoises at a temperature of 25° C.

EXAMPLE 21

A. To a reaction flask equipped with stirrer, thermometer, nitrogen inlet tube, and reflux condenser there were charged 130 grams of 2-ethylhexanol, 342 grams of epsilon-caprolactone, and 0.02 gram of tetraisopropyl titanate catalyst. The reactant mixture was heated to a tempreature of 170° C. for a period of 5 hours under an atmosphere of dry nitrogen. The resulting polyester product had a hydroxyl number of 119, a carboxyl number of 0.1, and a molecular weight of about 470.

B. 200 grams of the above polyester were acetylated by reacting with 50 grams of acetic anhydride at a temperature of 100° C. for a period of 5 hours. Excess acetic anhydride and acetic acid formed during the reaction were removed via distillation at 120° C. and a pressure of 2 mm. Hg. The resulting acetylated polyester was a pale yellow liquid having a molecular weight of about 500, as determined by conventional ebullioscopic techniques.

Samples of lactone polyesters prepared as set forth in the preceding twenty-one examples are evaluated as plasticizers as described in the section just prior to the operative examples. The data re recorded in Tables I–IV infra.

*Table I.—Plasticized vinyl resin compositions prepared with polyesters of Examples 1–5*

| Polyester, Example | 1A | 1A | 1B | 1B | 2B | 2B | 3B | 3B | 4 | 5B | 5B |
|---|---|---|---|---|---|---|---|---|---|---|---|
| Polyester, parts | 56 | 72 | 52 | 79 | 54 | 75 | 54 | 76 | 69 | 51 | 82 |
| Vinyl Resin, type | VYNW | VYNW | VYNW | VYNW | VYNW | VYNW | VYNW | VYNW | VYNW | QYSJ | QYSJ |
| Vinyl Resin, parts | 100 | 100 | 100 | 100 | 100 | 100 | 100 | 100 | 100 | 100 | 100 |
| Stabilizer, type | D-14 | D-14 | D-14 | D-14 | D-14 | D-14 | D-14 | D-14 | D-14 | D-14 | D-14 |
| Stabilizer, part | 0.5 | 0.5 | 0.5 | 0.5 | 0.5 | 0.5 | 0.5 | 0.5 | 0.5 | 0.5 | 0.5 |
| Milling temp., ° C | 158 | 158 | 158 | 158 | 158 | 158 | 158 | 158 | 158 | 165 | 165 |
| Molding temp., ° C | 158 | 158 | 158 | 158 | 158 | 158 | 158 | 158 | 158 | 158 | 158 |
| Tensile, p.s.i. (24.5° C.) | 2,900 | 2,250 | 2,850 | 2,250 | 2,725 | 2,300 | 2,820 | 2,360 | 2,425 | 2,900 | 2,100 |
| Elongation, percent (24.5° C.) | 285 | 335 | 295 | 375 | 285 | 360 | 285 | 365 | 325 | 250 | 375 |
| Load at 100% Elong., p.s.i. (24.5° C.) | 2,040 | 1,000 | 1,950 | 1,000 | 1,900 | 1,000 | 1,950 | 1,000 | 1,075 | 2,000 | 1,000 |
| ASTM Stiffness Modulus, p.s.i. (24.5° C.) | 1,600 | 650 | 1,975 | 1,150 | 2,100 | 625 | 1,625 | 725 | 900 | 1,440 | 420 |
| $T_F$, ° C | −1 | −15 | −1 | −16 | 0 | −12 | 1 | −14 | −25 | −2.5 | −24 |
| $T_4$, ° C | 17 | 2 | 16 | −1 | 16 | 4 | 16 | 2 | −3 | 14.5 | −5 |
| Brittle Temperature, ° C | −9 | −21 | −9 | −22 | −5 | −15 | −8 | −22 | −28 | −6 | −23 |
| Percent Extraction: Oil, 10 days at 25° C | 2.1 | 4.2 | 1.3 | 3.3 | 1.2 | 2.8 | Nil | 0.3 | 1.2 | 0.9 | 2.1 |
| Percent Extraction: Water, 10 days at 25° C | 0.4 | 0.5 | Nil | Nil | 0.1 | 0.1 | 0.3 | 0.5 | 2.1 | 0.2 | 0.4 |
| Durometer "A" Hardness (24.5° C.) | 80 | 64 | 80 | 57 | 80 | 62 | 80 | 60 | 64 | 80 | 56 |
| SPI Volatile Loss, percent in 24 hrs. at 70° C | 0.4 | 0.5 | 0.4 | 0.6 | 0.5 | 0.5 | 0.3 | 0.4 | 1.4 | 0.3 | 0.4 |
| Heat Stability Data: | | | | | | | | | | | |
| Initial Color, percent BLR | | 86 | | 82 | | 62 | | 65 | 88 | | 88 |
| Min. at 158° C. to 80% BLR | | 90 | | 30 | | | | | | | 44 |
| Min. at 158° C. to 75% BLR | | 123 | | 98 | | | | | 104 | | 62 |
| Min. at 158° C. to 60% BLR | | 140 | | 139 | | 1 | | 36 | 138 | | 107 |
| Min. at 158° C. to 15% BLR | | 220 | | 236 | | 32 | | 180 | 234 | | 170 |
| Sweat-out | None | None | None | None | None | None | None | None | None | None | None |
| Florida Exposure: Sun-hours to failure | | 500 | | 500 | | 500 | | 750 | 1,000 | | 500 |

Table II.—Plasticized vinyl resin compositions prepared with polyesters of Examples 6–11

| Polyester, Example | 6B | 7B | 7B | 8B | 8B | 9B | 9B | 10B | 10B | 11B | 11B |
|---|---|---|---|---|---|---|---|---|---|---|---|
| Polyester, parts | 69 | 51 | 69 | 47 | 66 | 54 | 81 | 51 | 74 | 52 | 70 |
| Vinyl Resin, type | VYNW | VYNW | VYNW | VYNW | VYNW | VYNW | VYNW | VYNW | VYNW | VYNW | VYNW |
| Vinyl Resin, parts | 100 | 100 | 100 | 100 | 100 | 100 | 100 | 100 | 100 | 100 | 100 |
| Stabilizer, type | D-14 | D-14 | D-14 | D-14 | D-14 | D-14 | D-14 | D-14 | D-14 | D-14 | D-14 |
| Stabilizer, part | 0.5 | 0.5 | 0.5 | 0.5 | 0.5 | 0.5 | 0.5 | 0.5 | 0.5 | 0.5 | 0.5 |
| Milling temp., °C | 158 | 158 | 158 | 158 | 158 | 158 | 158 | 158 | 158 | 158 | 158 |
| Molding temp., °C | 158 | 158 | 158 | 158 | 158 | 158 | 158 | 158 | 158 | 158 | 158 |
| Tensile, p.s.i. (24.5°C.) | 2,625 | 3,050 | 2,420 | 3,060 | 2,390 | 2,775 | 2,200 | 3,100 | 2,350 | 2,300 | 2,000 |
| Elongation, percent (24.5°C.) | 360 | 280 | 350 | 285 | 360 | 255 | 330 | 285 | 345 | 265 | 340 |
| Load at 100% Elong., p.s.i. (24.5°C.) | 1,190 | 1,900 | 1,000 | 1,920 | 1,000 | 2,140 | 1,000 | 1,980 | 1,000 | 1,700 | 1,000 |
| ASTM Stiffness Modulus, p.s.i. (24.5°C.) | 775 | 1,600 | 600 | 2,300 | 600 | 1,475 | 550 | 2,075 | 700 | 1,550 | 750 |
| $T_F$, °C | −21 | −9 | −19 | −3 | −17 | −4 | −17 | −7 | −21 | −2 | −7 |
| $T_4$, °C | −1 | 13 | −1 | 16 | 0 | 13 | −1 | 15 | −3 | 17 | 11 |
| Brittle Temperature, °C | −22 | −10 | −22 | −9 | −20 | −6 | −17 | −14 | −24 | −8 | −14 |
| Percent Extraction: Oil, 10 days at 25°C | 1.7 | 0.5 | 0.8 | 0.4 | 0.8 | 1.5 | 4.3 | 0.5 | 1.0 | Nil | Nil |
| Percent Extraction: Water, 10 days at 25°C | 2.1 | 0.2 | 0.1 | 0.2 | 0.2 | 0.1 | 0.1 | 1.1 | 1.5 | 0.1 | 0.1 |
| Durometer "A" Hardness (24.5°C.) | 67 | 80 | 66 | 80 | 63 | 80 | 62 | 80 | 61 | 80 | 67 |
| SPI Volatile Loss, percent in 24 hrs. at 70°C | 1.2 | 0.5 | 0.5 | 0.3 | 0.3 | 0.2 | 0.3 | 0.4 | 0.4 | 0.1 | 0.1 |
| Heat Stability Data: | | | | | | | | | | | |
| Initial Color, percent BLR | 76 | 86 | | 87 | | | 85 | 87 | | | 74 |
| Min. at 158°C. to 80% BLR | | | | 60 | | | 62 | 47 | | | |
| Min. at 158°C. to 75% BLR | | | | | | | 76 | 75 | | | |
| Min. at 158°C. to 60% BLR | 9 | 75 | | 123 | | | 127 | 123 | | | 122 |
| Min. at 158°C. to 15% BLR | 110 | 120 | | 145 | | | 244 | 220 | | | 240 |
| Sweat-out | 174 | 178 | | 276 | | | | | | | |
| | None | None | None | None | None | None | None | None | None | None | None |
| Florida Exposure: Sun-hours to failure | 1,000 | | | | 500 | | 500 | | 250 | | 750 |

Table III.—Plasticized vinyl resin compositions prepared with polyesters of Examples 12–16

| Polyester, Example | 12B | 12B | 13B | 13B | 14B | 14B | 15B | 15B | 16B | 16B |
|---|---|---|---|---|---|---|---|---|---|---|
| Polyester, parts | 56 | 73 | 53 | 74 | 59 | 84 | 61 | 88 | 57 | 83 |
| Vinyl Resin, type | VYNW | VYNW | VYNW | VYNW | VYNW | VYNW | VYNW | VYNW | VYNW | VYNW |
| Vinyl Resin, parts | 100 | 100 | 100 | 100 | 100 | 100 | 100 | 100 | 100 | 100 |
| Stabilizer, type | D-14 | D-14 | D-14 | D-14 | D-14 | D-14 | D-14 | D-14 | D-14 | D-14 |
| Stabilizer, part | 0.5 | 0.5 | 0.5 | 0.5 | 0.5 | 0.5 | 0.5 | 0.5 | 0.5 | 0.5 |
| Milling temp., °C | 158 | 158 | 158 | 158 | 158 | 158 | 158 | 158 | 158 | 158 |
| Molding temp., °C | 158 | 158 | 158 | 158 | 158 | 158 | 158 | 158 | 158 | 158 |
| Tensile, p.s.i. (24.5°C.) | 2,400 | 2,040 | 2,900 | 2,300 | 2,425 | 2,100 | 2,600 | 2,000 | 2,650 | 2,100 |
| Elongation, percent (24.5°C.) | 300 | 350 | 290 | 345 | 250 | 320 | 280 | 320 | 285 | 340 |
| Load at 100% Elong., p.s.i. (24.5°C.) | 1,600 | 1,000 | 1,900 | 1,000 | 1,800 | 1,000 | 2,000 | 1,000 | 1,900 | 1,000 |
| ASTM Stiffness Modulus, p.s.i. (24.5°C.) | 1,450 | 700 | 1,640 | 525 | 1,300 | 500 | 2,300 | 540 | 1,850 | 410 |
| $T_F$, °C | −2 | −11 | −4 | −14 | 0 | −12 | 0 | −12 | 0 | −11 |
| $T_4$, °C | 14 | 4 | 15 | 2 | 15 | 7 | 17 | 4 | 16 | 3 |
| Brittle Temperature, °C | −11 | −17 | −9 | −21 | −9 | −18 | −3 | −12 | −6 | −11 |
| Percent Extraction: Oil, 10 days at 25°C | Nil | Nil | Nil | Nil | Nil | Nil | Nil | 0.4 | 0.1 | 0.3 |
| Percent Extraction: Water, 10 days at 25°C | 0.1 | 0.1 | 0.2 | 0.2 | 0.1 | 0.2 | Nil | 0.2 | 0.1 | 0.1 |
| Durometer "A" Hardness (24.5°C.) | 80 | 66 | 80 | 63 | 80 | 61 | 80 | 61 | 80 | 62 |
| SPI Volatile Loss, percent in 24 hrs. at 70°C | 0.1 | 0.2 | 0.1 | 0.2 | 0.1 | 0.2 | 0.1 | 0.1 | 0.2 | 0.3 |
| Heat Stability Data: | | | | | | | | | | |
| Initial Color, Percent BLR | | 50 | | 74 | 57 | | 75 | | | 83 |
| Min. at 158°C. to 80% BLR | | | | | | | | | | 33 |
| Min. at 158°C. to 75% BLR | | | | | | | 0 | | | 58 |
| Min. at 158°C. to 60% BLR | | | | 30 | | | 46 | | | 118 |
| Min. at 158°C. to 15% BLR | | 236 | | 176 | 178 | | 155 | | | 176 |
| Sweat-out | None | None | None | None | None | None | None | None | None | None |
| Florida Exposure: Sun-hours to failure | | 750 | | 750 | | 750 | | | | 500 |

Table IV.—Plasticized vinyl resin composition prepared with polyesters of Examples 17–24

| Polyester, Example | 17B | 17B | 18B | 18B | 19B | 19B | 20B | 20B | 21B |
|---|---|---|---|---|---|---|---|---|---|
| Polyester, parts | 55 | 80 | 51 | 69 | 51 | 69 | 52 | 69 | 66 |
| Vinyl Resin, type | VYNW | VYNW | VYNW | VYNW | VYNW | VYNW | QYTQ | QYTQ | VYNW |
| Vinyl Resin, parts | 100 | 100 | 100 | 100 | 100 | 100 | 100 | 100 | 100 |
| Stabilizer, type | D-14 | D-14 | D-14 | D-14 | D-14 | D-14 | D-14 | D-14 | D-14 |
| Stabilizer, part | 0.5 | 0.5 | 0.5 | 0.5 | 0.5 | 0.5 | 0.5 | 0.5 | 0.5 |
| Milling temp., °C | 158 | 158 | 158 | 158 | 158 | 158 | 158 | 158 | 158 |
| Molding temp., °C | 158 | 158 | 158 | 158 | 158 | 158 | 158 | 158 | 158 |
| Tensile, p.s.i. (24.5°C.) | 2,640 | 2,100 | 2,740 | 2,280 | 2,800 | 2,400 | 2,575 | 2,050 | 2,575 |
| Elongation, Percent (24.5°C) | 245 | 345 | 295 | 345 | 300 | 370 | 305 | 340 | 375 |
| Load at 100% Elong., p.s.i. (24.5°C.) | 1,900 | 1,000 | 1,700 | 1,000 | 1,800 | 1,000 | 1,700 | 1,000 | 1,000 |
| ASTM Stiffness Modulus, p.s.i. (24.5°C.) | 1,675 | 600 | 2,170 | 825 | 1,600 | 530 | 2,200 | 670 | 890 |
| $T_F$, °C | 0 | −13 | −3 | −16 | 1 | −9 | −18 | −29 | −47 |
| $T_4$, °C | 18 | 1 | 16 | 5 | 18 | 7 | 9 | −6 | −19 |
| Brittle Temperature, °C | −9 | −18 | −12 | −21 | −14 | −27 | −21 | −30 | −48 |
| Percent Extraction: Oil, 10 days at 25°C | Nil | Nil | 0.1 | 0.1 | 0.2 | 0.2 | 5.3 | 11.7 | 21.3 |
| Percent Extraction: Water, 10 days at 25°C | 0.4 | 0.5 | 0.1 | 0.1 | 0.2 | 0.2 | Nil | Nil | 3.6 |
| Durometer "A" Hardness (24.5°C.) | 80 | 58 | 80 | 65 | 80 | 63 | 80 | 67 | 67 |
| SPI Volatile Loss, percent in 24 hrs. at 70°C | 0.1 | 0.1 | 0.3 | 0.2 | 0.3 | 0.3 | 0.1 | 0.1 | 7.2 |
| Heat Stability Data: | | | | | | | | | |
| Initial Color, percent BLR | | 33 | 88 | | | 83 | | 85 | 87 |
| Min. at 158°C. to 80% BLR | | | 53 | | | 11 | | 24 | |
| Min. at 158°C. to 75% BLR | | | 75 | | | 30 | | 46 | 124 |
| Min. at 158°C. to 60% BLR | | | 99 | | | 67 | | 114 | 136 |
| Min. at 158°C. to 15% BLR | | 84 | 160 | | | 120 | | >480 | 174 |
| Sweat-out | None | None | None | None | None | None | None | None | None |
| Florida Exposure: Sun-hours to failure | | 500 | | 500 | | 750 | | | 1,250 |

In the following examples, initiators, lactones and catalysts, of varying amounts and identities, were mixed and heated to a controlled temperature of 170° C. while a slow stream of nitrogen was passed through the mixture to exclude air and moisture, thus preventing discoloration of the polyester from oxygen. The polymerization was followed by refractive index measurements at 30° C., the reaction being regarded as complete as soon as the index became constant. The particular catalysts, the amounts used, the polymerization time and the hydroxyl and carboxyl number and color of the polyester products are noted.

EXAMPLE 22

| | |
|---|---|
| Lactone | 539 grams epsilon-caprolactone and 602 grams beta- and delta-methyl-epsilon-caprolactones. |
| Initiator | 31 grams of ethylene glycol. |
| Catalyst | 0.55 gram calcium methoxide. |
| Recation time | 24 hours. |
| Hydroxyl number | 48.4. |
| Carboxyl number | 0.3. |
| Molecular weight | 2280. |
| Color | Yellow. |

EXAMPLE 23

| | |
|---|---|
| Lactone | 350 grams beta- and delta-methyl-epsilon-caprolactones. |
| Initiator | 11.1 grams dipentaerythritol. |
| Catalyst | 0.10 gram zinc borate. |
| Reaction time | 17 hours. |
| Hydroxyl number | 38.2. |
| Carboxyl number | 1.4. |
| Viscosity | Medium. |
| Color | Light yellow. |

EXAMPLE 24

| | |
|---|---|
| Lactone | 100 grams alpha- and epsilon-methyl-epsilon-caprolactones and 250 grams beta- gamma- and delta-methyl-epsilon-caprolactones. |
| Initiator | 12.0 grams diethylenetriamine. |
| Catalyst | 0.10 gram tetrabutyl titanate. |
| Reaction time | 4 hours. |
| Hydroxyl number | 50.4. |
| Carboxyl number | 2.6. |
| Viscosity | Medium. |
| Color | Yellow. |

EXAMPLE 25

| | |
|---|---|
| Lactone | 400 grams mixture of dimethyl-, ethyl-, trimethyl-, methylethyl- and propyl-caprolactones (prepared from a xylenol fraction boiling at 224–229° C.). |
| Initiator | 8.45 grams ethylene glycol. |
| Catalyst | 0.2 gram tetrabutyl titanate. |
| Reaction time | 22.5 hours. |
| Hydroxl number | 36.4. |
| Carboxyl number | 1.9. |
| Viscosity | Medium. |
| Color | Reddish brown. |

EXAMPLE 26

| | |
|---|---|
| Lactone | 400 grams gamma-methyl-epsilon-caprolactone. |
| Initiator | 8.3 grams ethylene glycol. |
| Catalyst | None. |
| Reaction time | 72 hours. |
| Hydroxyl number | 37.3. |
| Carboxyl number | 0.3. |
| Molecular weight | 2950. |
| Color | Yellow. |

EXAMPLE 27

| | |
|---|---|
| Lactone | 150 grams mixture of alpha-, beta-, gamma-, delta- and epsilon-methyl - epsilon - caprolactones (prepared from o-, m-, and p-cresols) and 150 grams epsilon-caprolactone. |
| Initiator | 11.6 grams aniline. |
| Catalyst | 0.15 gram tetraisopropyl titanate. |
| Reaction time | 18.5 hours. |
| Hydroxyl number | 22. |
| Carboxyl number | 0.3. |
| Molecular weight | 2480. |
| Color | Pale brown. |

The molecular weight range of the products prepared in accordance with Examples 22 through 27 was from about 2000 to 10,000. The molecular weight of each product is readily calculable from the hydroxyl and carboxyl numbers and the functionality of the polyester by the following formula:

$$M.W. = \frac{\text{Functionality} \times 1000 \times 56.1}{\text{Hydroxyl number} + (2 \times \text{carboxyl number})}$$

Molecular weight so calculated is fairly accurate, particularly so long as the carboxyl content is fairly low, i.e., not appreciably greater than about five.

In most of the examples in which a brown color is reported, technical or practical grade initiators were employed, indicating that the brown color is due not to decomposition of the lactones during the polymerization, but from impurities contained in the initiator.

EXAMPLE 28

730 grams of adipic acid, 570 grams of epsilon-caprolactone and 357 grams of ethylene glycol were heated to 160° C. under nitrogen until the water of condensation ceased to distill over. The reactions were then maintained at an increased temperature of 180–190° C. for an additional seventy-two hours. The mixture was thereupon subjected to a vacuum of 3 mm. for six hours at 120° C. A pale brown, viscous polyester having a hydroxyl number of 40 and a carboxyl number of 1.4 was obtained.

EXAMPLE 29

636 grams of a mixture of 13 parts glutaric acid to 37 parts glutaric anhydride, 570 grams of epsilon-caprolactone and 357 grams of ethylene glycol were heated under nitrogen to 160° C. until the water of condensation ceased to distill over. The reactants were then kept at 180° C. for an additional sixty hours and then subjected to a vacuum of 3 mm. for three hours at the same temperature. The resulting polyester was a yellow, viscous liquid having a hydroxyl number of 46 and a carboxyl number of 2.7.

EXAMPLE 30

592 grams of phthalic anhydride, 456 grams of epsilon-caprolactone and 298 grams of ethylene glycol were heated to 160° C. under nitrogen until the water of condensation ceased to distill off. The reactants were then kept at the same temperature for another twenty-four hours and then subjected to a vacuum of 20 mm. for 3.5 hours still at the same temperature. The resulting polymer was a very viscous, yellow liquid having a hydroxyl number of 48.6 and a carboxyl number of 1.2.

EXAMPLE 31

664 grams of isophthalic acid, 456 grams of epsilon-caprolactone and 318 grams of ethylene glycol were heated to 180° C. under nitrogen for six days. The reactants were then subjected to a vacuum of 20 mm. for four hours while the temperature was increased to 200° C. The resulting polyester was a rubbery, semi-solid material, having a hydroxyl number of 45.9 and a carboxyl number of 0.3.

The polyesters of Examples 22, 23, 24, 25, 26, and 27 were acetylated by reacting them for four to five hours at 100° C. with four times the amount of acetic anhydride theoretically required on the basis of their hydroxyl contents. Excess acetic anhydride and acetic acid were then removed under vacuum. Finally, the acetylated polyesters were passed over a falling film evaporator at 170–180° C. under a vacuum of 1–5 mm. of Hg to remove remaining small quantities of volatile materials.

The remaining products were then tested as plasticizers by milling for five minutes at 158° C. on a laboratory two-roll mill with a 96:4 vinyl chloride-vinyl acetate copolymer and 0.5% dibutyltin maleate stabilizer. The resulting clear, flexible sheets were molded at 158° C. to form specimens suitable for testing. The data are recorded in Table V below.

These lactone polyesters, especially the liquid lactone polyesters which have a minimum average molecular weight greater than about 500, have been exemplified in Examples 10 and 28–31 supra. These liquid lactone polyesters are extremely satisfactory as plasticizers especially if the reactive end groups are esterified or acylated in known manner such as by reaction with monocarboxylic acids and/or their anhydrides as discussed and illustrated in a previous section of this specification.

The glycols, diamines, or amino alcohols which can be employed in this embodiment have been illustrated in the discussion re the initiators. By way of examples, they include ethylene glycol, the propylene glycols (1,2- and 1,3-), the butylene glycols (1,2-, 1,4-, and 2,3-), the pentylene glycols, the hexylene glycols, the heptylene glycols, the octylene glycols, etc. In addition, one can incorporate a small quantity of triols, tetrols, pentols, hexols, etc. (in addition to the glycol) into the reaction

*Table V*

| Example No. | 22 | 23 | 24 | 25 | 26 | 27 |
|---|---|---|---|---|---|---|
| Molecular Weight | 2,350 | 7,900 | 3,100 | 2,900 | 3,000 | 2,525 |
| Viscosity, cps. at 20° C | 4,780 | 41,600 | 20,920 | 37,760 | 7,790 | 18,800 |
| Viscosity, cps. at 50° C | 1,020 | 5,480 | 2,584 | 2,368 | 1,432 | 5,170 |
| Effectiveness, percent | 39.9 | 40.9 | 44.4 | 45.6 | 41.0 | 43.2 |
| Tensile Strength, p.s.i | 2,390 | 2,280 | 2,100 | 2,150 | 2,420 | 2,360 |
| Elongation, percent | 360 | 345 | 345 | 340 | 350 | 365 |
| ASTM Stiffness Modulus, p.s.i | 600 | 825 | 600 | 570 | 600 | 725 |
| $T_F$, ° C | −17 | −16 | −13 | −14 | −19 | −14 |
| $T_4$, ° C | 0 | 5 | 1 | 3 | −1 | 2 |
| Brittle Temperature, ° C | −20 | −21 | −18 | −12 | −22 | −22 |
| Percent Extraction: | | | | | | |
| Oil | 0.8 | 0.1 | Nil | 3.2 | 0.8 | 0.3 |
| Water | 0.2 | 0.1 | 0.5 | 0.2 | 0.1 | 0.5 |
| Shore Hardness "A" | 63 | 65 | 58 | 60 | 66 | 60 |
| SPI Volatile Loss | 0.3 | 0.2 | 0.1 | 0.4 | 0.5 | 0.4 |
| Sweat-out | None | None | None | None | None | None |

While in accordance with the embodiments of the invention emphasized in foregoing descriptions and examples the lactone rings are opened and connected directly to one another, it is also within the scope of the invention to form lactone polyesters useful as plasticizers in which the lactone residues need not necessarily be connected directly to one another. This is readily accomplished, for example, by reacting mixtures of lactones with combinations of initiators such as dibasic acids plus glycols, diamines, or amino alcohols. This type of reaction and the type of polyester produced thereby may be illustrated by the reaction of one mol of adipic acid, one mol of gamma-methyl-epsilon-caprolactone and slightly more than one mole of ethylene glycol which results in a hydroxyl terminated polyester having the general formula:

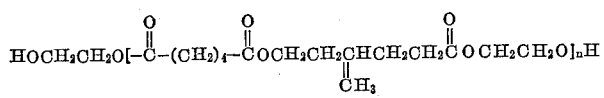

in which the acid, lactone, and glycol residues are in random distribution and not necessarily as specifically illustrated. The variations in structure and in distribution that are obtainable by this means can readily be appreciated in view of the fact that the lactone is capable of reacting with both the acid and the glycol.

Lactone polyesters produced in accordance with this embodiment of the invention, as indicated above, are valuable as plasticizers, particularly if the reactive end groups are esterified, and as intermediates in the preparation of polyurethane resins and coating compositions. It is preferable to utilize a slight excess of glycols, diamines, or amino alcohols over the molar amount of dicarboxylic acid employed in order to achieve a lactone polyester having predominantly terminal hydroxyl or amino groups and to remove the water of condensation formed by the reaction of the dibasic acid with the hydroxyl or amino groups of the glycols, diamines, or amino alcohols.

mixture, providing the resulting lactone polyester is a liquid product at room temperture. Illustrative of the aliphatic dicarboxylic acids are adipic, glutaric, succinic, pimelic, azelaic, suberic, sebasic, etc., acids. In addition, one can incorporate a small quantity of a higher polycarboxylic acid (tri-, tetra-, penta-, hexa-, etc.) into the reaction mixture so long as this resulting lactone polyester is a liquid product. Mixtures of aliphatic dicarboxylic acids and anhydrides can also be employed. Aliphatic amino alcohols of the nature exemplified previously can be employed in lieu of the glycol or diamine. Of course, mixtures of amino alcohols, diamines, and glycols can be employed. The lactones which can be utilized have been adequately discussed previously. However, epsilon-caprolactone, monoalkyl-, dialkyl-, and trialkyl-epsilon-caprolactones, monoalkoxy-, dialkoxy-, and trialkoxy-epsilon-caprolactones, and mixtures thereof are especially desirable.

With reference to this embodiment optimum plasticizing properties are obtainable with esterified polyesters having molecular weights between about 2000 and 4000 and prepared with monomethyl lactones and mixtures of monomethyl and unsubstituted lactones.

It is apparent that various modifications will readily occur to those skilled in the art upon reading this description. All such modifications are intended to be included within the scope of the invention as defined in the accompanying claims.

What is claimed is:

1. A plasticized composition comprising a major portion of a mixture of a plasticizable resin of the group consisting of polyvinyl chloride, polyvinyl butyral, copolymers of vinyl chloride with monoethylenically unsaturated monomers copolymerizable therewith, and copolymers of acrylonitrile with monethylenically unsaturated monomers copolymerizable therewith; and, as the plasticizer therefor, a lactone polyester which has an average molecular weight of from about 300 to 9000; said lactone polyester being formed by the reaction of an admixture containing a lactone of the formula:

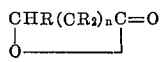

wherein $n$ is an integer of from four to six, wherein at least $n+2R$ variables are hydrogen, and wherein the remaining R variable are of the group consisting of hydrogen, alkyl, cycloalkyl, alkoxy, and single ring aromatic hydrocarbon radicals, none of the said R variables having more than 12 carbon atoms; and an organic functional initiator having at least one reactive hydrogen substituent and being of the group consisting of alcohols, amines, polyols, polyamines, amino alcohols, polycarboxylic acids, hydroxycarboxylic acids, and aminocarboxylic acids; said lactone being in molar excess with relation to said inititator; said initiator being capable of opening the lactone ring whereby said lactone is added to said initiator as a substantially linear group thereto; said lactone polyester possessing, on the average, at least two of said linear groups, each of said linear groups having the formula:

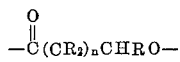

wherein the variables $n$ and R have the aforesaid meanings.

2. The plasticized composition of claim 1 wherein the reactive terminal groups of said lactone polyester have been end-blocked by reacting said polyester with a compound selected from the group consisting of alcohols, aliphatic monocarboxylic acids, and the anhydrides thereof.

3. The plasticized composition of claim 2 wherein said lactone polyester has an average molecular weight upwards of about 1500.

4. The plasticized composition of claim 2 wherein said lactone polyester is formed by the reaction of an admixture containing epsilon-caprolactone and a hydroxyl-containing initiator.

5. The plasticized composition of claim 2 wherein said lactone polyester has an average molecular weight between about 2000 and about 4000.

6. The plasticized composition of claim 2 wherein said plasticizable resin is polyvinyl chloride.

7. The plasticized composition of claim 2 wherein said plasticizable resin is a copolymer of vinyl chloride and monoethyleneically unsaturated monomers copolymerizable therewith.

8. The plasticized composition of claim 2 wherein said vinyl plasticizable resin is a copolymer of vinyl chloride and vinyl acetate.

9. The plasticized composition consisting essentially of a plasticizable vinyl chloride resin and, as the plasticizer therefor, a liquid lactone polyester having at least one hydroxyl end group and an average molecular weight of from about 300 to 900; said polyester being formed by the reaction of an admixture containing epsilon-caprolactone and a hydroxyl-containing initiator, said epsilon-caprolactone being in molar excess with relation to said initiator, whereby said epsilon-caprolactone is added to said initiator as a substantially linear group thereto; said polyester possessing, on the average, at least two of said linear groups, each of said linear groups having a terminal oxy group at one end, a carbonyl group at the other end, and an intermediate chain of five methylene groups.

10. The plasticized composition of claim 9 wherein said lactone polyester has been reacted with a compound of the group consisting of aliphatic monocarboxylic acids and the anhydrides thereof, thus acylating the terminal hydroxyl groups of said polyester.

11. The plasticized composition of claim 10 wherein said lactone polyester has an average molecular weight upwards of about 1500.

12. A plasticized composition consisting essentially of a plasticized vinyl chloride resin and, as the plasticizer therefor, a liquid lactone polyester having at least one hydroxyl end group and an average molecular weight of from about 300 to 900; said polyester being formed by the reaction of an admixture containing epsilon-caprolactone and an amino-containing initiator, said epsilon-caprolactone being in molar excess with relation to said initiator, whereby said epsilon-caprolactone is added to said initiator as a substantially linear group thereto; said polyester possessing, on the average, at least two of said linear groups, each of said linear groups having a terminal oxy group at one end, a carbonyl group at the other end, and an intermediate chain of five methylene groups.

13. The plasticized composition of claim 12 wherein said lactone polyester has been recated with a compound of the group consisting of aliphatic monocarboxylic acids and the anhydrides thereof, thus acylating the terminal hydroxyl groups of said polyester.

14. The plasticized composition of claim 13 wherein said lactone polyester has an average molecular weight upwards of about 1500.

15. A plasticized composition consisting essentially of a plasticizable vinyl chloride resin and, as the plasticizer therefor, a liquid lactone polyester having at least one carboxyl end group and an average molecular weight of from about 300 to 900; said polyester being formed by the reaction of an admixture containing epsilon-caprolactone and a carboxyl-containing initiator, said epsilon-caprolactone being in molar excess with relation to said initiator, whereby said epsilon-caprolactone is added to said initiator as a substantially linear group thereto; said polyester possessing, on the average, at least two of said linear groups, each of said linear groups having a terminal oxy group at one end, a carbonyl group at the other end, and an intermediate chain of five methylene groups.

16. The plasticized composition of claim 15 wherein said lactone polyester has been reacted with an alcohol thus esterifying the carboxyl end group of said polyester.

17. The plasticized composition of claim 15 wherein said lactone polyester has an average molecular weight upwards of about 1500.

18. A plasticized composition consisting essentially of a plasticizable vinyl chloride resin and, as the plasticizer therefor, a liquid hydroxyl-terminated lactone polyester; said polyester being formed by heating (a) an epsilon-caprolactone having at least one hydrogen substituent on the carbon atom which is attached to the oxy group in the caprolactone ring, and which has no more than three alkyl substituents attached to the carbon atoms in the caprolactone ring, none of said alkyl substituents having more than 12 carbon atoms, with (b) a dicarboxylic acid, and (c) a molar excess, in relation to the amount of dicarboxylic acid, of a member of the group consisting of glycols, diamines, and amino alcohols; to a temperature in the range of from about 50° to 300° C.; thus producing a polyester having at least two substantially linear groups therein, each of said linear groups having a terminal oxy group at one end, a carbonyl group at the other end, and an intermediate chain of five carbon atoms which has at least one hydrogen substituent on the carbon atom in said intermediate chain that is attached to said terminal oxyl group.

19. The plasticized composition of claim 18 wherein said hydroxyl-terminated lactone polyester has been reacted with a compound of the group consisting of aliphatic monocarboxylic acids and the anhydrides thereof, thus acylating the terminal hydroxyl groups of said polyester.

20. The plasticized composition of claim 19 wherein said polyester has an average molecular weight between about 2000 and 4000.

21. A plasticized composition consisting essentially of a plasticizable vinyl chloride resin and, as the plasticizer therefor, a liquid hydroxyl-terminated lactone polyester; said polyester being formed by heating (a) an admixture containing epsilon-caprolactone and a substituted epsilon-caprolactone, said substituted epsilon-caprolactone having up to three alkyl substituents, none of said substituents having more than 12 carbon atoms, the total number of said carbon atoms in the substituents not exceeding 12, and at least one hydrogen substituent on the carbon atom which is attached to the oxy group in the substituted lactone ring, with (b) a dicarboxylic acid, and (c) a molar excess, in relation to the amount of dicarboxylic acid, of a member of the group consisting of glycols, diamines, and amino alcohols; to a temperature in the range of from about 50 to 300° C.; thus producing a polyester having at least two substantially linear groups therein, each of said linear groups having a terminal oxy group at one end, a carbonyl group at the other end, and an intermediate chain of five carbon atoms.

22. The plasticized composition of claim 21 wherein said hydroxyl-terminated lactone polyester has been reacted with a compound of the group consisting of aliphatic monocarboxylic acids and the anhydrides thereof, thus acylating the terminal hydroxyl groups of said polyester.

23. The plasticized composition of claim 21 wherein said lactone polyester has an average molecular weight between about 2000 and 4000.

References Cited by the Examiner
UNITED STATES PATENTS

| | | | |
|---|---|---|---|
| 2,890,208 | 6/1959 | Young et al. | 260—78.3 |
| 2,929,827 | 3/1960 | Carruthers | 260—32.2 |
| 2,933,478 | 4/1960 | Young et al. | 260—77.5 |
| 3,186,971 | 6/1965 | Hostettler et al. | |

MORRIS LIEBMAN, *Primary Examiner.*

L. T. JACOB, *Assistant Examiner.*

UNITED STATES PATENT OFFICE
CERTIFICATE OF CORRECTION

Patent No. 3,274,143 September 20, 1966

Fritz Hostettler et al.

It is hereby certified that error appears in the above numbered patent requiring correction and that the said Letters Patent should read as corrected below.

Column 25, line 58 and column 26, lines 5 and 27, for "900", each occurrence, read -- 9000 --.

Signed and sealed this 22nd day of August 1967.

(SEAL)
Attest:

ERNEST W. SWIDER
Attesting Officer

EDWARD J. BRENNER
Commissioner of Patents